United States Patent [19]
Howell

[11] Patent Number: 5,454,359
[45] Date of Patent: Oct. 3, 1995

[54] CONTINUOUS HIGH PRESSURE RAIL DEAERATION SYSTEM FOR FUEL INJECTION SYSTEM

[75] Inventor: Edward H. Howell, Wheaton, Ill.

[73] Assignee: Navistar International Transportation Corp., Chicago, Ill.

[21] Appl. No.: 347,627

[22] Filed: Dec. 1, 1994

[51] Int. Cl.⁶ .................................................. F02M 37/20
[52] U.S. Cl. ................................................ 123/516; 123/446
[58] Field of Search ..................................... 123/446, 516, 123/456, 447, 518

[56] References Cited

U.S. PATENT DOCUMENTS

| | | | |
|---|---|---|---|
| 4,539,961 | 9/1985 | Atkins | 123/516 |
| 4,601,275 | 7/1986 | Weinand | 123/516 |
| 4,876,993 | 10/1989 | Slattery | 123/516 |
| 4,955,409 | 9/1990 | Tokuda | 123/456 |
| 4,966,120 | 10/1990 | Itoh | 123/516 |
| 4,971,016 | 11/1990 | Peters | 123/446 |
| 5,095,876 | 3/1992 | Yonekawa | 123/516 |
| 5,168,855 | 12/1992 | Stone | 123/446 |
| 5,213,083 | 5/1993 | Glassey | 123/447 |
| 5,245,970 | 9/1993 | Iwasziciewicz et al. | 123/447 |
| 5,359,976 | 11/1994 | Nakashima | 123/516 |
| 5,392,749 | 2/1995 | Stockner | 123/446 |

Primary Examiner—Carl S. Miller
Attorney, Agent, or Firm—Dennis K. Sullivan

[57] ABSTRACT

A continuous deaeration system for use in maintaining a high pressure oil rail of a hydraulically-actuated, electronically-controlled unit fuel injector system free of entrapped air including a tube, one end of which seats in an oil passage leading from the high pressure rail to the front injector of each bank of the engine. The other end of the tube seats within an upper area of the rail, where air may be trapped. The tube thus creates oil flow into the injector from the area of the rail having the air therein, causing the air to be quickly purged through the injector.

10 Claims, 1 Drawing Sheet

U.S. Patent
Oct. 3, 1995
5,454,359
FIG. 1
PRIOR ART
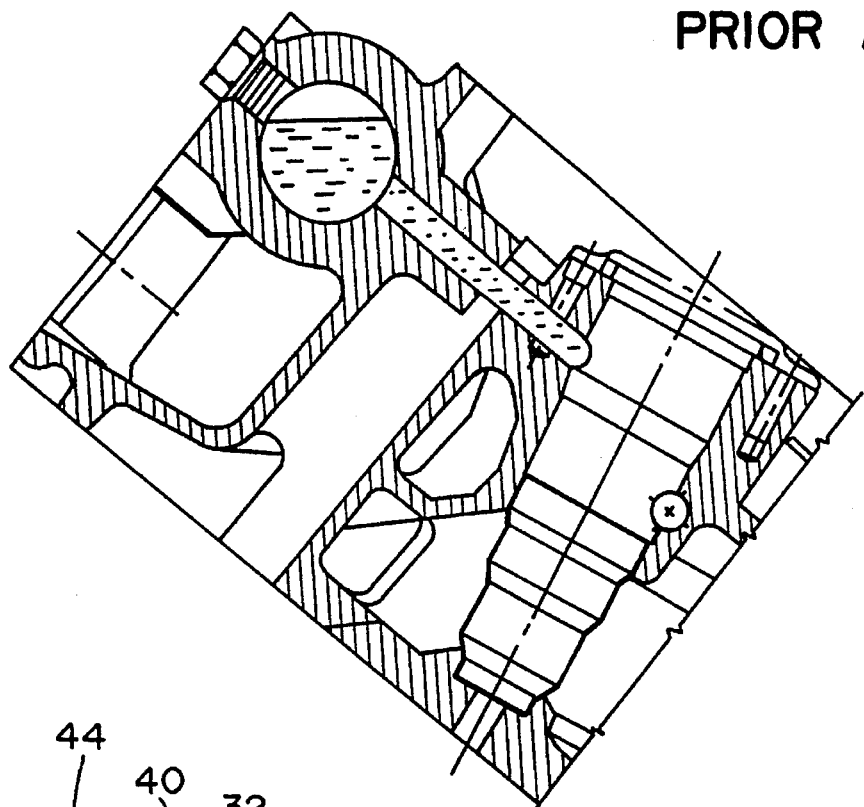
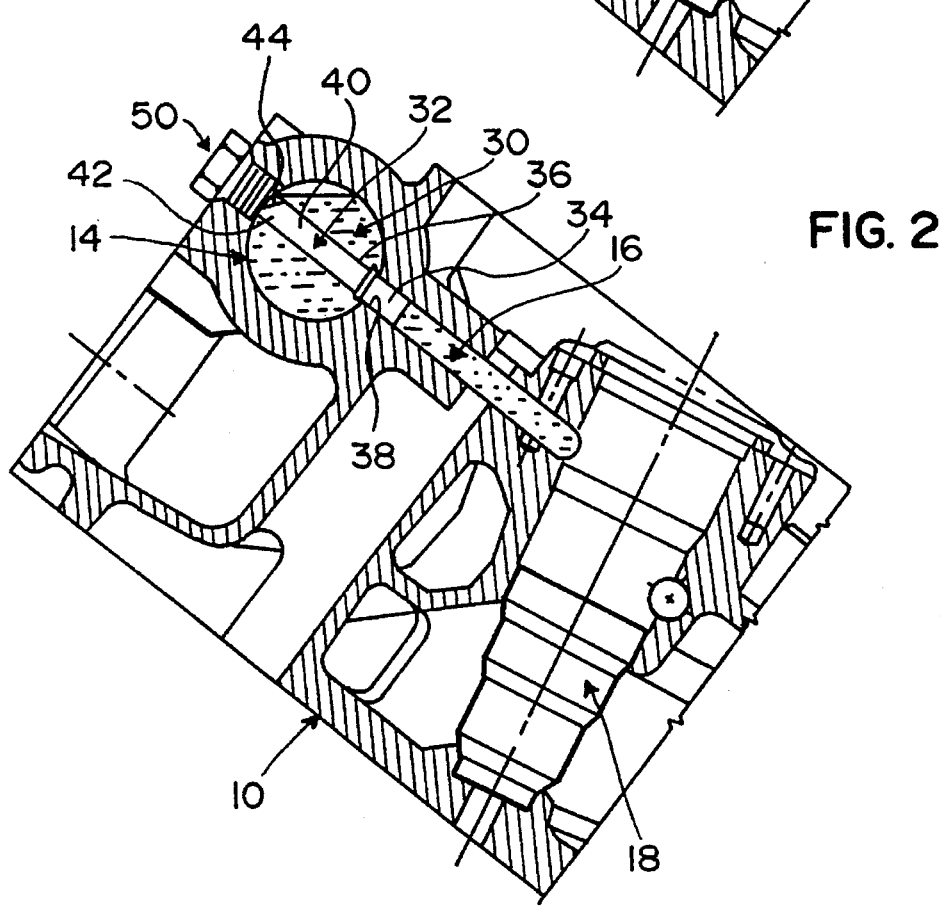
FIG. 2

CONTINUOUS HIGH PRESSURE RAIL DEAERATION SYSTEM FOR FUEL INJECTION SYSTEM

BACKGROUND OF THE INVENTION

The present invention provides a continuous deaeration system for use in removing air trapped in the high pressure actuating oil rail of a hydraulically-actuated, electronically-controlled, unit injector fuel system, hereinafter referred to as a HEUI fuel injection system. More specifically, the deaeration system comprises an extension tube which seats in the high pressure actuating oil rail which extends longitudinally along on each bank of a V-8 engine. The tube extends into the air pocket at the highest point of the rail adjacent the front injector and causes the air to be purged through the front injector on each bank continuously during engine operation.

THE PRIOR ART

A HEUI fuel injection system for a diesel engine is described in U.S. Pat. No. 5,245,970. In the HEUI fuel system, lubricating oil is supplied at high pressure through a common rail passage to each of a series of unit fuel injectors within the cylinder head. Fuel is also supplied by rail to the injectors and a solenoid-controlled valve in the injectors govern the application of the high pressure lubricating oil to provide the force to inject the fuel into the engine cylinders at even higher pressures through the use of an intensifier.

In vehicles having a diesel engine incorporating a HEUI fuel injection system, poor startability/driveability, that is, engine roughness or stumble, has been noted during the first 50 miles of driving. This condition is believed to be caused by air entrapped within the high pressure rail which runs longitudinally along each cylinder head. Since the engine is angled forwardly upwardly somewhat to maintain a straighter driveline, the air tends to collect in the rail adjacent the front cylinder.

Further, when an oil change and oil filter replacement are performed on such engines, the problem repeats itself because air is reintroduced into the system, again for an initial period of about 50 miles.

Further, entrapped air is a problem during manufacture of the engines, because the cranking time of the engine is increased by the necessity to purge the air in the high pressure rail. Thus, testing time for engines at the end of an assembly line is increased. For example, it typically takes 25 to 30 seconds of cranking time to start an engine because of the effects of the entrapped air. With the continuous deaeration system of the present invention, cranking time can be shortened to 2 seconds. Not only is cranking time reduced, but driveability problems associated with entrapped air in the high pressure rails disappear as well.

SUMMARY OF THE INVENTION

Accordingly, it is a primary object of the invention to provide a system which provides for continuous and automatic deaeration of high pressure oil rails serving a HEUI fuel injection system.

It is a still further object to provide a deaeration system which reduces engine crank-to-start time.

It is yet a further object to provide a deaeration system which eliminates engine driveability problems such as roughness and stumble.

This and other objects of the invention are specifically met in a continuous deaeration system for a high pressure oil rail of a hydraulically-actuated, electronically-controlled unit fuel injector system wherein a tube seats at one end in an oil passage leading from the high pressure rail to the front injector on each bank of the engine while the other end of the tube extends to an upper area of the rail, where air may be entrapped. Since the tube creates oil flow into the injector passage from the cavity of the rail having the air therein, the air in that cavity must be purged through the injector to the level of the top of the tube before the high pressure oil will flow through the tube. Accordingly, there is continuous deaeration of the high pressure rail and the startability/driveability problems associated with entrapped air in the high pressure rails are eliminated.

BRIEF DESCRIPTION OF THE DRAWINGS

Other objects and advantages of the invention will become more apparent upon perusal of the detailed description thereof and upon inspection of the drawings in which:

FIG. 1 is a transverse cross-section taken along a line through the front fuel injector of a prior art cylinder head of one bank of a V-8 diesel engine incorporating a high pressure oil rail of a HEUI injection system; and FIG. 2 is a transverse cross-section similar to FIG. 1 and shows the extension tube of the continuous deaeration system of the present invention disposed within an oil passage leading to the fuel injector and extending therefrom into the oil rail.

DESCRIPTION OF THE PREFERRED EMBODIMENT

Referring now to the drawings in greater detail, there is illustrated in the drawings a cross-section through a cylinder head 10 incorporating a high pressure lubricating oil rail 14 and a branch passage 16 of a HEUI fuel injection system for a diesel engine. The Heui fuel injection system and its operation is specifically described and explained in U.S. Pat. No. 5,245,970 which is incorporated herein by reference.

In the HEUI fuel system, high pressure lubricating oil is supplied at pressures ranging from 450 to 3000 psi to the high pressure rail 14 and is distributed therefrom through individual passages 16 to an injector bore 18 for each cylinder covered by the cylinder head 10. An electronically-controlled unit fuel injector (not shown) is disposed in the bore 18 which receives low pressure fuel from a separate common rail and uses the high pressure lubricating oil to supply the force for injecting the fuel in the engine cylinder.

The high pressure oil rail 14 is cast into the cylinder head 10 and runs longitudinally of the engine. Since the engine is typically tilted upwardly slightly from the rear to the front to accommodated the vehicle drive line, the oil rail 14 also rises from the rear of the engine toward the front end thereof. Thus, if any air enters the rail 14, it naturally rises to the top and front of the rail 14 and collects at a location above that from which oil is fed to the front injector as shown best in FIG. 1. In the prior art design, the high pressure engine oil used to operate the injector is drawn from a bottom area of the rail 14, allowing the air to remain entrapped in the top part of the rail 14. The compressibility of the entrapped air in the rail adjacent the front injector of each bank causes poor startability and driveability for the engine when the engine is new or when the oil and filter of the engine have been changed. Although the entrapped air eventually becomes dispersed in the oil and is discharged through the injector, until such dispersion takes place, problems with starting and engine function may be encountered.

In accordance with the invention, a continuous deaeration system 30 of the present invention is provided to quickly remove the entrapped air from the rail 14. As shown in FIG. 2, the deaeration system 30 includes a tube 32 which has a first end 34 configured to sealingly engage within the passage 16 as by a press fit. Proximate to the end 34, an external annular rib 36 on the extension tube 32 abuts against the cylinder head surface surrounding the entrance 38 into the passage 16, allowing end 34 to extend only a predetermined distance into the passage 16. The tube 32 extends into and substantially diametrically across the high pressure rail 14 to a distal end 40 adjacent the opposite inner wall of the rail 14. A tip 42 of the tube 32 at the distal end 40 of the tube is cut on a plane oblique to a center axis of the tube 32, creating an elliptical opening 44 therein and a pointed tip 42. The tube 32 is rotationally positioned within the rail 14 in such a manner as to place the elliptical opening 44 in an upwardly facing orientation to reduce the size of the pocket of entrapped air in the rail 14 as much as possible by creating an escape path for the air.

It will be understood here that the annular rib 36 is positioned along the length of the tube 32 in a manner as to engage the tube tip 42 against the inner wall of the rail 16 created by an O-ring plug 50, such abutting engagement serving to maintain orientation of the opening 44 in the tube tip 42.

Insertion of the tube 32 is relatively simple. The cylinder head 10 already includes the O-ring plug 50 therein, for allowing drilling of the passage 16. Thus, once the passage 16 is drilled out, the tube 32 is merely dropped into place in the desired orientation, and the O-ring plug 50 is installed to seal the rail.

In operation, oil is drawn into the passage 16 from the top area of the rail 14 rather than from the bottom, and this oil drawing configuration first draws the entrapped air from the top area of the rail 16, quickly purging the HEUI system 10 of substantially all the trapped air by forcing the air, under pressure, into and through the first injector passage 16 on each bank of the V-8 engine.

As described above, the continuous deaeration system produces a number of advantages, some of which have been described above and others of which are inherent in the invention. Also, it will be evident to those of ordinary skill in the art that various alterations and modifications can be made to the system without departing from the teachings herein. For example, although an elliptical cut is made in the tip of the tube, the tube could simply have an appropriately positioned and sized hole, or series of holes, through the tube wall. Accordingly, the scope of the invention is only to be limited as necessitated by the accompanying claims.

What is claimed is:

1. In an engine having a hydraulically-actuated, electronically-controlled unit injector system including a high pressure rail associated with a cylinder head of said engine for supplying actuating fluid to a unit injector and a fluid passage extending from said high pressure rail to a bore adapted to receive a unit injector, the improvement comprising a continuous deaeration system associated with a high point within said rail, said deaeration system comprising a hollow tube having a first end disposed in sealing engagement within said fluid passage and having a second end extending into the rail toward a distal end adjacent said high point.

2. The system of claim 1 wherein the tube second end is cut on a plane oblique to a center axis of the tube, forming an elliptical opening at the end, the tube having a pointed tip and being oriented so that the pointed tip abuts against the rail and the elliptical opening is upwardly directed.

3. The system of claim 1 wherein the tube has a predetermined length and has an annular rib disposed on an outer surface thereof at a predetermined position along the length thereof, the annular rib having a diameter greater than a diameter of the passage and engaging against a surface surrounding an entrance into the passage.

4. The system of claim 3 wherein said rib is located at a position which causes the second end of the tube to engage an upper surface of the rail opposite the passage.

5. The system of claim 1 wherein the tube creates a continuation of the passage causing oil to flow into the channel from an uppermost area of the rail.

6. The system of claim 1 and a drill port disposed in the cylinder head, said drill port leading into the rail in alignment with the passage and with said tube.

7. The system of claim 6 wherein an O-ring plug is engaged within the drill port to seal same.

8. In an engine having a cylinder head for covering a plurality of cylinders including a forwardmost cylinder, a hydraulically-actuated, electronically-controlled unit injector system including a high pressure rail for supplying actuating fluid to a unit injector and a fluid passage extending from an intersection with said high pressure rail to a bore associated with said forwardmost cylinder, said bore being adapted to receive a unit injector, the improvement comprising a hollow tube having a first end disposed in sealing engagement within said fluid passage and having a second end extending into the rail toward a distal end adjacent an area on an inner wall of said rail diametrically opposite said intersection, said hollow tube having an aperture therein adjacent said distal end.

9. The system of claim 8 wherein the tube distal end is cut on a plane oblique to a center axis of the tube, forming an elliptical aperture at the distal end, the tube having a pointed tip and being oriented so that the pointed tip abuts against said inner wall of said rail and the elliptical opening is upwardly directed.

10. The system of claim 9 and a drill port disposed in the cylinder head, said drill port leading into the rail in alignment with the passage and with said tube and a plug is engaged within the drill port to seal same, said pointed tip engaging said plug.

* * * * *